(12) United States Patent
Tsai

(10) Patent No.: US 7,802,660 B2
(45) Date of Patent: Sep. 28, 2010

(54) QUICK-RELEASE DEVICE OF A BICYCLE BRAKE CABLE

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 365 days.

(21) Appl. No.: 12/024,995

(22) Filed: Feb. 1, 2008

(65) Prior Publication Data

US 2009/0194374 A1 Aug. 6, 2009

(51) Int. Cl.
*B62L 1/06* (2006.01)
(52) U.S. Cl. .................. 188/24.13; 188/24.12
(58) Field of Classification Search .... 188/24.11–24.22
See application file for complete search history.

(56) References Cited

U.S. PATENT DOCUMENTS 7,000,739 B2 * 2/2006 Ciamillo .................. 188/24.22
2009/0078512 A1 * 3/2009 Edwards et al. .......... 188/24.12

* cited by examiner

*Primary Examiner*—Melanie Torres Williams

(57) ABSTRACT

A quick-release device of a bicycle brake cable includes a brake arm mounted on a frame of the bicycle, a guider selectively slidably mounted on a free end of the brake arm and a safe lever pivotally mounted in the brake arm. The brake arm includes a groove defined along an axis thereof. The guider is hollow to allow the brake cable extending therethrough. The safe lever includes a pivot point that divides the safe lever into a press portion and a stop portion extending toward the guider to prevent the guider from an accidental operation due to an improper force.

1 Claim, 5 Drawing Sheets

QUICK-RELEASE DEVICE OF A BICYCLE BRAKE CABLE

BACKGROUND OF THE INVENTION

1. Field of the Invention

The present invention relates to a quick-release device, and more particularly to a quick-release device of a bicycle brake cable.

2. Description of Related Art

A brake device of a bicycle must be designed under two factors including brake effect and quickly releasing the tension of the brake cable when changing the wheel. A conventional brake device of a bicycle includes two brake pads for clamping the wheel rim to achieve the effect of brake. However, the two brake pads are very closed to the wheel rim and the tire has a diameter greater than a width of the wheel rim. Consequently, the tension of the brake cable must be greatly released to enlarge the width between the two brake pads before changing the wheel. As a result, the tension of the brake cable must be adjusted again after changing the wheel. It will take a lot of time when changing the wheel.

The present invention has arisen to mitigate and/or obviate the disadvantages of the conventional brake device of a bicycle.

SUMMARY OF THE INVENTION

The main objective of the present invention is to provide a quick-release device of a bicycle brake cable for quickly releasing the tension of the brake cable when changing the wheel.

To achieve the objective, quick-release device in accordance with the present invention comprises a brake arm mounted on a frame of the bicycle, a guider selectively slidably mounted on a free end of the brake arm and a safe lever pivotally mounted in the brake arm. The brake arm includes a groove defined along an axis thereof. The guider is hollow to allow the brake cable extending therethrough. The safe lever includes a pivot point that divides the safe lever into a press portion and a stop portion extending toward the guider to prevent the guider from an accidental operation due to an improper force.

Further benefits and advantages of the present invention will become apparent after a careful reading of the detailed description with appropriate reference to the accompanying drawings.

DETAILED DESCRIPTION OF THE INVENTION

Figure 1:
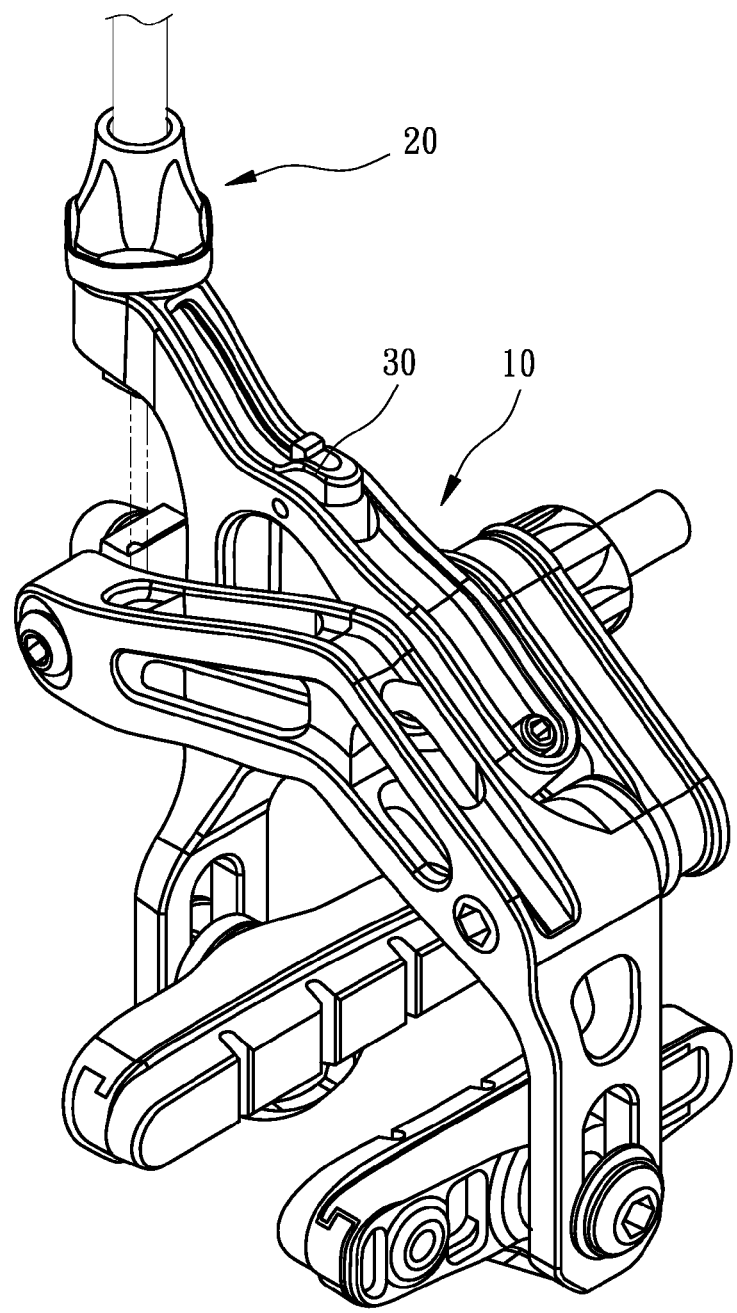
FIG. 1 is a perspective schematic view of a quick-release device of a bicycle brake cable in accordance with the present invention.
Figure 2:
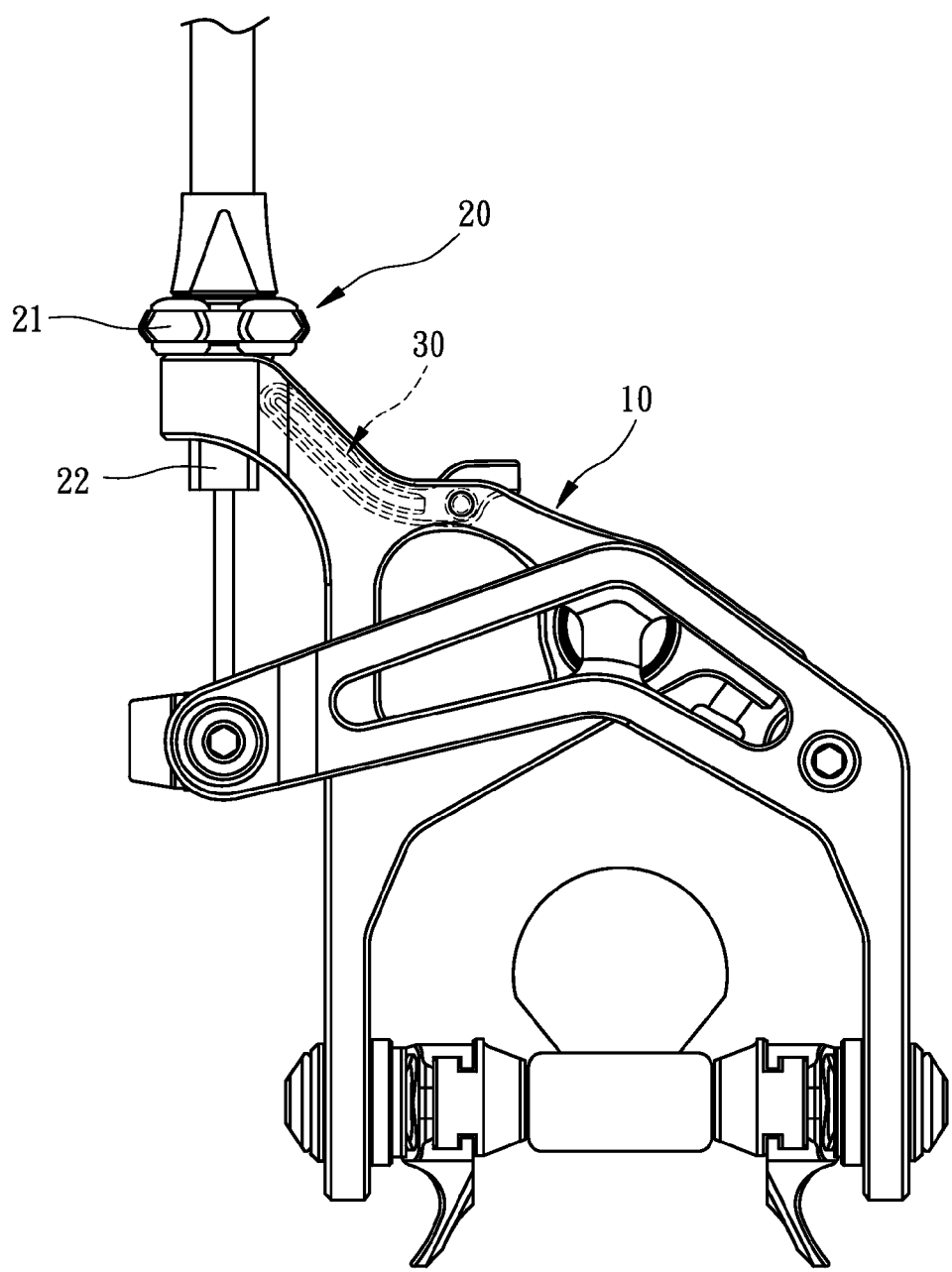
FIG. 2 is a front plan schematic view of the quick-release device of a bicycle brake cable in accordance with the present invention.
Figure 3:
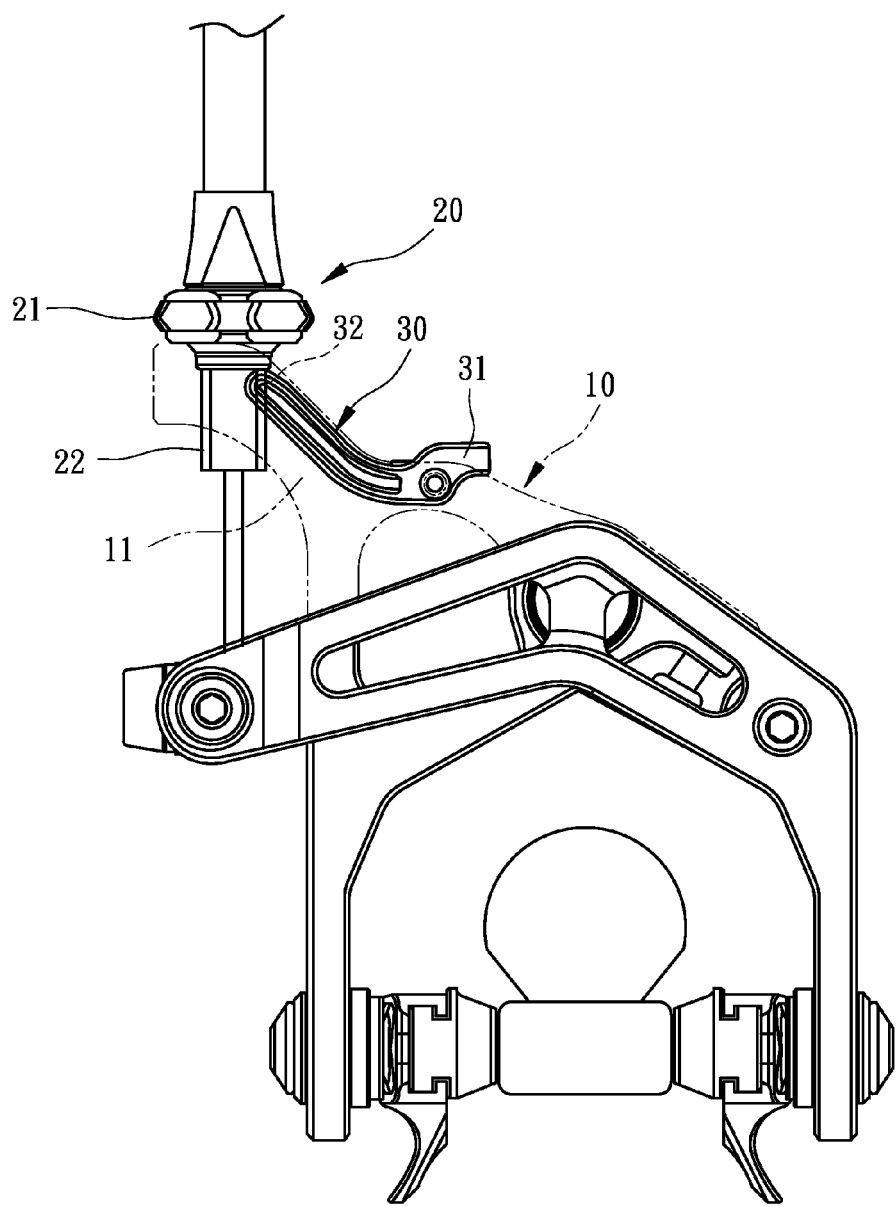
FIG. 3 is another front plan schematic view of the quick-release device of a bicycle brake cable in accordance with the present invention.

Referring to the drawings and initially to FIGS. 1-3, a quick-release device of a bicycle brake cable in accordance with the present invention comprises a brake arm (10) adapted to be mounted on a frame of the bicycle, a guider (20) selectively slidably mounted on a free end of the brake arm (10) and a safe lever (30) pivotally mounted in the brake arm (10).

The brake arm (10) includes a groove (11) defined along an axis of the brake arm (10). The guider (20) is hollow to allow the brake cable extending therethrough. The guider (20) includes a head (21) sliding along a top face of the brake arm (10) and an insertion (22) extending into the groove (11). The insertion (22) is engaged to an inner periphery of the groove (11) to prevent the guider (20) from rotating relative to the brake arm (10) and changing the tension of the brake cable.

The safe lever (30) has a pivot point that divides the safe lever (30) into a press portion (31) and a stop portion (32) extending toward the guider (20). The stop portion (32) has a free end abutting against the insertion (22) to prevent the guider (20) from an accidental operation due to an improper force.

Figure 4:
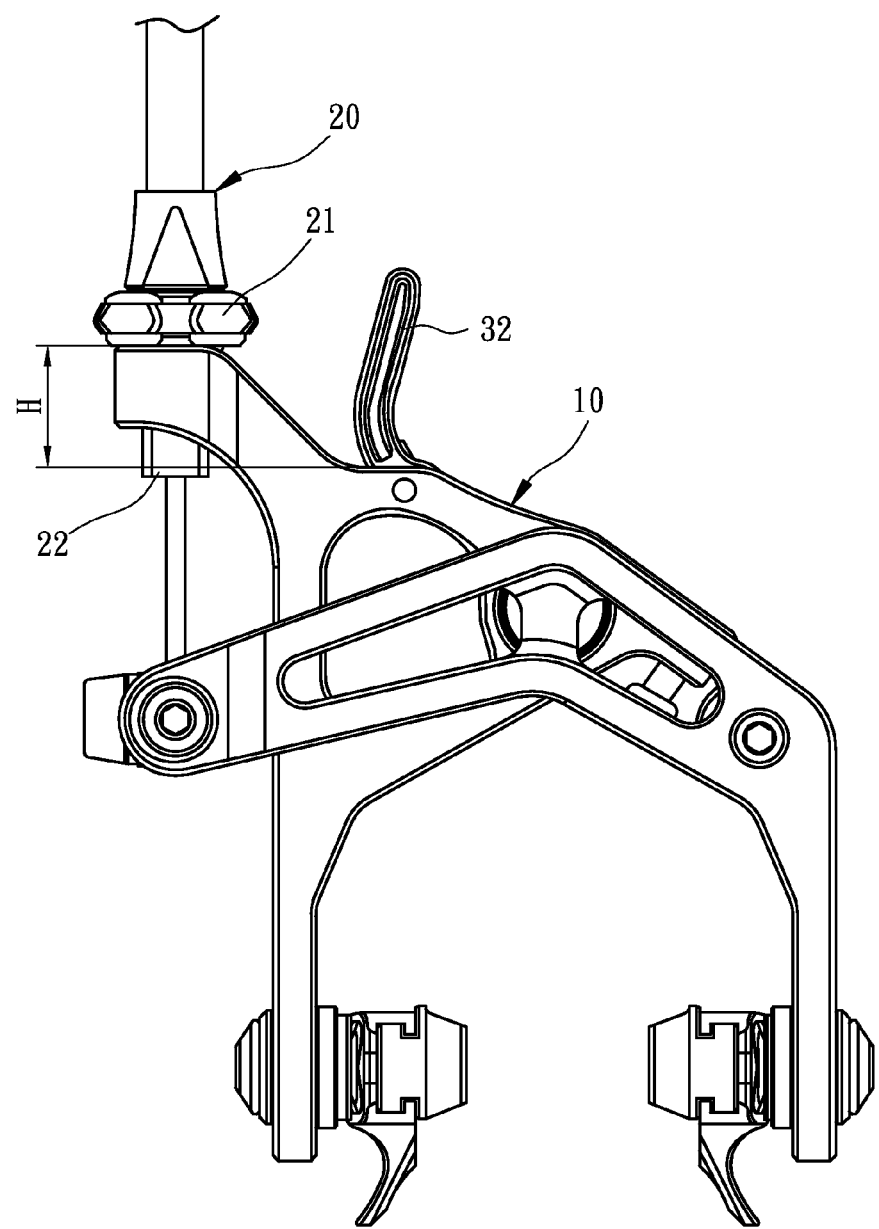
FIG. 4 is a first operational view of the quick-release device of the present invention.
Figure 5:
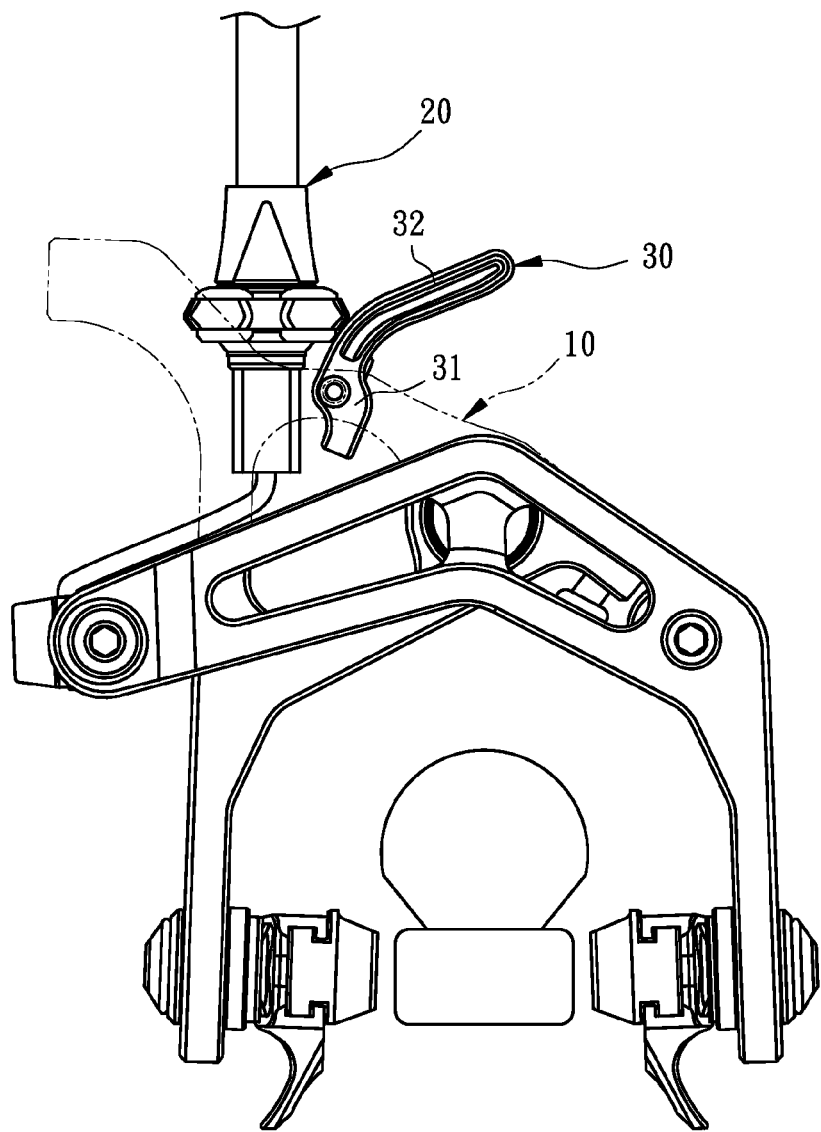
FIG. 5 is a second operational view of the quick-release device of the present invention.

With reference to FIGS. 4 and 5, when replacing the bicycle wheel, the user firstly presses the press portion (31) to make the free end of the stop portion (32) be disengaged from the insertion (22) and pull the brake cable with the guider (20) moved toward the middle portion of the brake arm (10) along the groove (11) such that the brake cable is quickly loosened due to a reduction of a height difference (H) between the head (21) and the base of the stop portion (32). As a result, the brake arm (10) of the bicycle is outwardly opened such that the operator can easily detach the wheel from the brake device using any tools.

Although the invention has been explained in relation to its preferred embodiment, it is to be understood that many other possible modifications and variations can be made without departing from the spirit and scope of the invention as hereinafter claimed.

What is claimed is:

1. A quick-release device of a brake cable of a bicycle, comprising:

a brake arm adapted to be mounted on a frame of the bicycle;

a guider selectively slidably mounted on a free end of the brake arm; and a safe lever pivotally mounted in the brake arm, wherein the brake arm comprises a groove defined along an axis thereof, the guider is hollow to allow the brake cable to extend therethrough, and the safe lever comprises a pivot point that divides the safe lever into a press portion and a stop portion extending toward the guider to prevent the guider from an accidental operation due to an improper force; and wherein the guider comprises a sliding head and an insertion extending into and urging against the groove to prevent the guider from rotating relative to the brake arm and the brake cable from being loosened.

* * * * *